United States Patent
Bradley et al.

(10) Patent No.: US 9,811,399 B1
(45) Date of Patent: Nov. 7, 2017

(54) MAINTAINING TEMPORARY WHITE LISTS FOR APPLICATION NOTIFICATIONS

(71) Applicant: International Business Machines Corporation, Armonk, NY (US)

(72) Inventors: Lisa Wood Bradley, Cary, NC (US); Liam Harpur, Skerries (IE); Aaron J. Quirk, Cary, NC (US); Lin Sun, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/222,251

(22) Filed: Jul. 28, 2016

(51) Int. Cl.
 *G06F 9/54* (2006.01)
 *G06F 17/30* (2006.01)

(52) U.S. Cl.
 CPC ........ *G06F 9/542* (2013.01); *G06F 17/30864* (2013.01)

(58) Field of Classification Search
 CPC ..................................................... G06F 9/542
 See application file for complete search history.

(56) References Cited

U.S. PATENT DOCUMENTS

| | | | |
|---|---|---|---|
| 7,890,338 B2 | 2/2011 | Loder et al. | |
| 8,112,485 B1 * | 2/2012 | Cooley | G06Q 10/107 709/206 |
| 8,161,552 B1 | 4/2012 | Sun et al. | |
| 8,315,600 B2 | 11/2012 | Liu et al. | |
| 9,014,359 B1 * | 4/2015 | Pfeffer | H04M 3/436 379/142.02 |
| 2006/0031333 A1 | 2/2006 | O'Neill | |
| 2006/0200530 A1 * | 9/2006 | Tokuda | H04L 12/5855 709/206 |
| 2015/0288634 A1 | 10/2015 | Emigh et al. | |

FOREIGN PATENT DOCUMENTS

EP    1811438 A1    7/2007

OTHER PUBLICATIONS

Robb, D. "Whitelisting: Why and How It Works", retrieved from http://www.esecurityplanet.com/malware/whitelisting-why-and-how-it-works.html; Sep. 2014.
Patterson, B. "Shhh! 3 ways to keep your pre-Lollipop Android phone quiet", retrieved from http://www.pcworld.com/article/2857736/shhh-3-ways-to-keep-your-pre-lollipop-android-phone-quiet.html; Dec. 2014.
Lui et al. "Detecting and Filtering Instant Messaging Spam—A Global and Personalized Approach", Department of Computer Science and Engineering the Ohio State University, 2005.

* cited by examiner

*Primary Examiner* — H S Sough
*Assistant Examiner* — Abdou Seye
(74) *Attorney, Agent, or Firm* — Brown & Michaels, PC; Nicholas D. Bowman

(57) ABSTRACT

Filtering audible notifications to the user from a device based on an enhanced white list with a static white list set by the user and a temporary white list. The temporary white list includes expiring entries. The entries of the temporary white are based on keywords and context extracted from the applications and activities on the device that are associated with a dependency list between applications of the device and context. If a notification is present on the temporary white list or the static list, the notification from the application audibly sound to the user through the device.

18 Claims, 5 Drawing Sheets

MAINTAINING TEMPORARY WHITE LISTS FOR APPLICATION NOTIFICATIONS

BACKGROUND

The present invention relates to management of notifications from a device, and more specifically to maintaining temporary white lists for application notifications from a device to a user.

Users of mobile devices can become overwhelmed by notification sounds generated from various applications. Developers of nearly all mobile applications leverage the device's notification features in some way to get the user's attention. While this is a nice feature, the culmination of many applications on a single device can mean the device is constantly making noise. Many users combat the constant flow of notification sounds by disabling them completely. Others use notification "white lists" to enable only sounds from certain applications. Still further, some users extend the white lists to only allow notification sounds from certain applications combined with a specific set of preferred users.

While these approaches reduce the noise generated on a device, they can be too coarse-grained. Some notifications may be missed that the user may have been interested in.

SUMMARY

According to one embodiment of the present invention, a method of filtering notifications to the user from a device based on an enhanced white list comprising a static white list set by the user and a temporary white list is disclosed. The method comprising the steps of: a processor of the device monitoring applications and activities on the device which generate notifications to the user to create and maintain a temporary white list to be used with a static white list of the enhanced white list for notifications to the user, the processor of the device receiving a notification from an application of the device for the user; and if the application is on the enhanced white list, allowing the notification from the application to audibly sound to the user through the device. Creating and maintaining a temporary white list to be used with a static white list of the enhanced white list for notifications to the user comprising the steps of the processor: monitoring the applications and activities on the device which generate notifications and determining which of the monitored applications and activities on the device are not present on the static white list; searching for and analyzing activities of the device and user interaction with the device to extract at least keywords and context associated with the activities and user interaction of the device; determining whether the keywords and context extracted are associated with a dependency list between applications of the device and context; and if the keywords and context extracted are present on the dependency list, adding the application and activity on the device as an expiring entry on the temporary white list.

According to another embodiment of the present invention, a computer program product for filtering notifications to the user from a device based on an enhanced white list comprising a static white list set by the user and a temporary white list is disclosed. The computer program product comprising, a computer comprising at least one processor, one or more memories, one or more computer readable storage media, the computer program product comprising a computer readable storage medium having program instructions embodied therewith, the program instructions executable by the computer. The program instructions comprising: monitoring, by the computer, applications and activities on the device which generate notifications to the user to create and maintain a temporary white list to be used with a static white list of the enhanced white list for notifications to the user, receiving, by the computer, a notification from an application of the device for the user; and if the application is on the enhanced white list, allowing the notification from the application to audibly sound to the user through the device. Creating and maintaining a temporary white list to be used with a static white list of the enhanced white list for notifications to the user by the program instructions of: monitoring, by the computer, the applications and activities on the device which generate notifications and determining which of the monitored applications and activities on the device are not present on the static white list; searching for and analyzing, by the computer, activities of the device and user interaction with the device to extract at least keywords and context associated with the activities and user interaction of the device; determining, by the computer, whether the keywords and context extracted are associated with a dependency list between applications of the device and context; and if the keywords and context extracted are present on the dependency list, adding, by the computer, the application and activity on the device as an expiring entry on the temporary white list.

According to another embodiment of the present invention a computer system for filtering notifications to the user from a device based on an enhanced white list comprising a static white list set by the user and a temporary white list. The computer system comprising a computer, the computer comprising at least one processor, one or more memories, one or more computer readable storage media having program instructions executable by the computer to perform a method comprising: sending, based on an input from the user into the device, an outgoing communication to a recipient; determining, in response to the sending the outgoing communication, whether in the recipient is on the enhanced white list; if the recipient is not on the enhanced white list, adding, based on the sending the outgoing communication, the recipient as an entry on the temporary white list; receiving, by the device and after the sending the outgoing communication, an incoming communication from the recipient; and if the recipient is on the enhanced white list at when the incoming communication is received, allowing notification of the incoming communication to audibly sound to the user through the device.

DETAILED DESCRIPTION

It will be recognized that in an illustrative embodiment of the present invention, the mobile device can dynamically adjust to the user in order to notify the user in select situations while maintaining a static white list policy.

It will also be recognized that in an illustrative embodiment of the present invention, the enhanced white list for notification sounds reduces missed notifications. The enhanced white list contains both a static white list with authorized notifications from applications and contacts set by the user as well as a temporary white list with entries for applications and specific events that are currently authorized to generate sounds on the device, but only for a designated amount of time before expiration. Items are added to the temporary white list based on a user's activity on the device. The entries of the temporary white list are preferably based on a user's recent application context activity with the device. Entries on the temporary white list expire after a given period of time or a specific event occurs.

Figure 1:
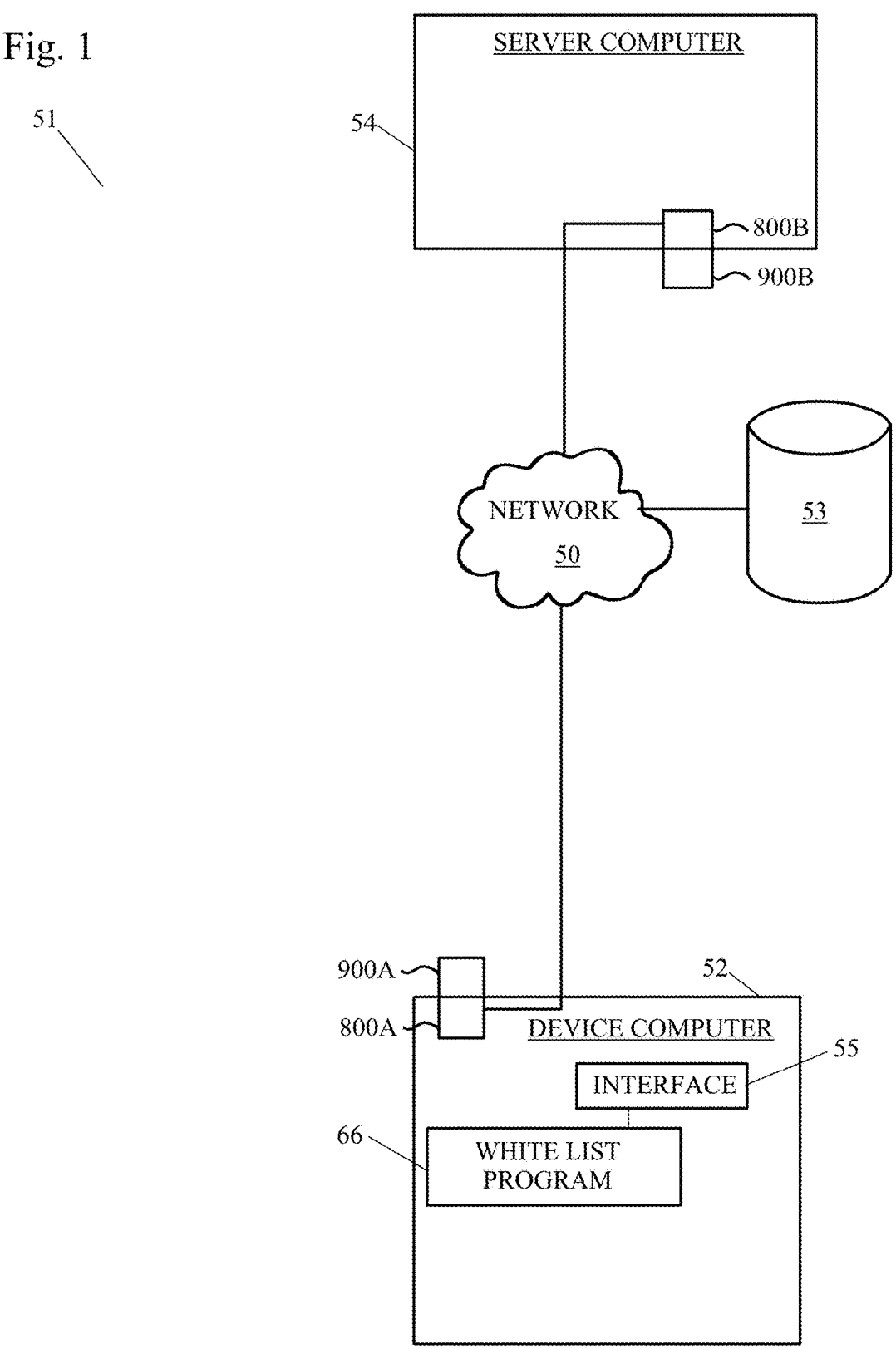
FIG. 1 depicts an exemplary diagram of a possible data processing environment in which illustrative embodiments may be implemented.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, device computers 52, repository 53, and server computer 54 connect to network 50. In other exemplary embodiments, network data processing system 51 may include additional device computers, storage devices, server computers, and other devices not shown.

Figure 5:
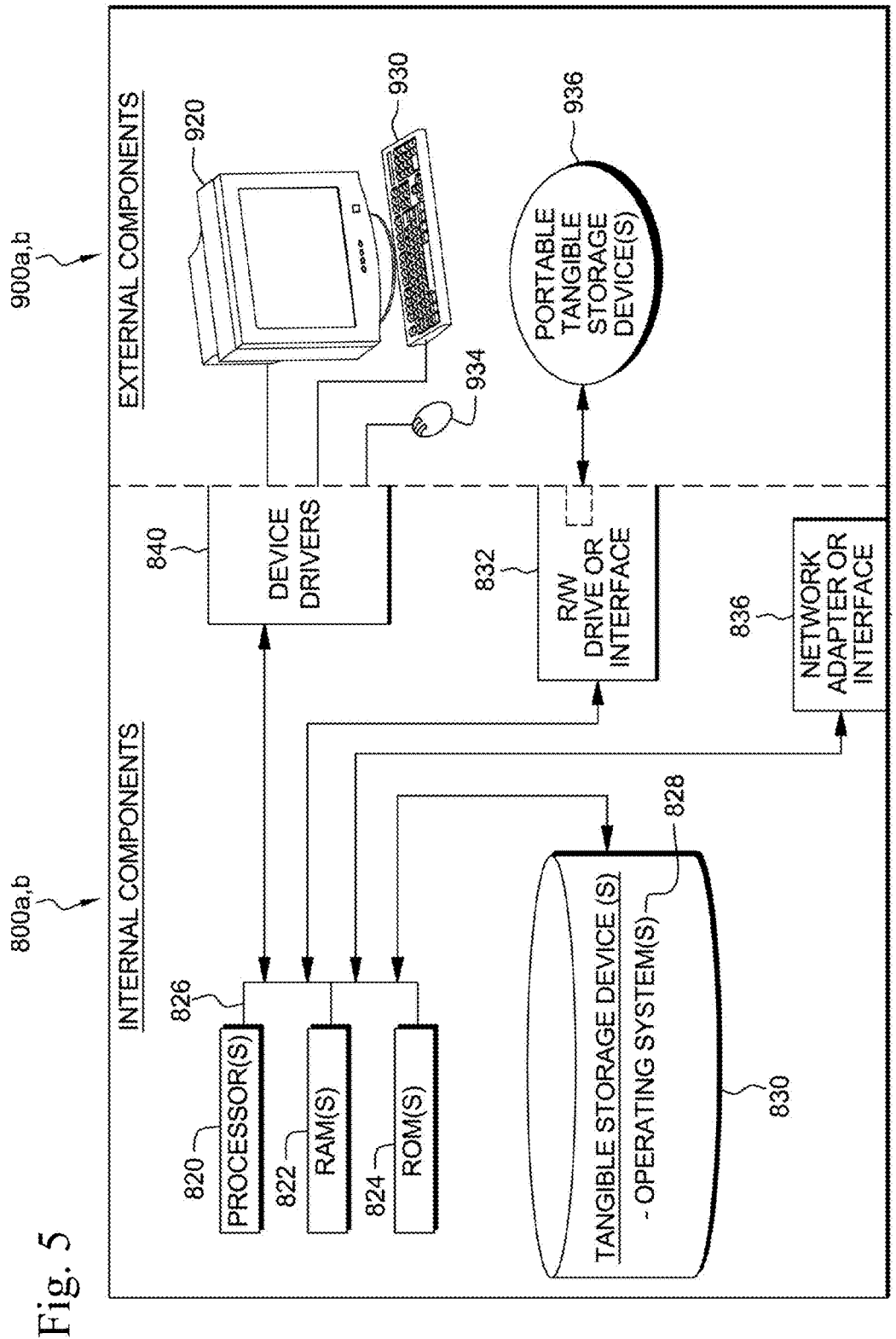
FIG. 5 illustrates internal and external components of a mobile device and a personal imaging device and a server computer in which illustrative embodiments may be implemented.

A device computer includes a set of internal components 800a and a set of external components 900a, further illustrated in FIG. 5. The device or client computer 52 may be a mobile device, smart phone, laptop, personal computer, or other electronic device which can receive notifications both external to the device computer and from applications running on the device computer. The device computer 52 may contain an interface 55. The interface 55 may accept commands and data entry from a user regarding which applications and contacts can generate notifications to generate an enhanced white list. Other input to interact with the applications of the device may also be received through the interface 55. The interface 55 can be, for example, a command line interface, a graphical user interface (GUI), a web user interface (WUI), or a touch user interface (TUI). The device computer 52 may include a white list program 66. The device computer 52 may receive incoming communications, for example phone calls, text messages, voice messages, e-mails and other communications which, depending on the enhanced white list, may generate a notification noise such as ringing, buzzing, chirping, or other sounds.

Server computer 54 includes a set of internal components 800b and a set of external components 900b illustrated in FIG. 5. Server computer 54 may contain an interface. The interface can be, for example, a command line interface, a graphical user interface (GUI), or a web user interface (WUI). In the depicted example, server computer 54 provides information, such as boot files, operating system images, and applications to the device computer 52. Server computer 54 can compute the information locally or extract the information from other computers on network 50.

Program code and programs such as the white list program 66 may be stored on at least one of one or more computer-readable tangible storage devices 830 shown in FIG. 5, on at least one of one or more portable computer-readable tangible storage devices 936 as shown in FIG. 5, or on storage unit or repository 53 connected to network 50, or may be downloaded to a computer, such as device computer 52 or server computer 54, for use.

For example, program code and programs such as white list program 66 may be stored on at least one of one or more storage devices 830 on server computer 54 and downloaded to device computer 52 over network 50 for use on device computer 52. Alternatively, server computer 54 can be a web server, and the program code, and programs such as white list program 66 may be stored on at least one of the one or more storage devices 830 on server computer 54 and accessed on device computers 52. In other exemplary embodiments, the program code, and programs such as white list program 66 may be stored on at least one of one or more computer-readable storage devices 830 on device computer 52 or distributed between two or more servers.

In the depicted example, network data processing system 51 is the Internet with network 50 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 51 also may be implemented as a number of different types of networks, such as, for example, an intranet, local area network (LAN), or a wide area network (WAN). FIG. 1 is intended as an example, and not as an architectural limitation, for the different illustrative embodiments.

Figure 2:
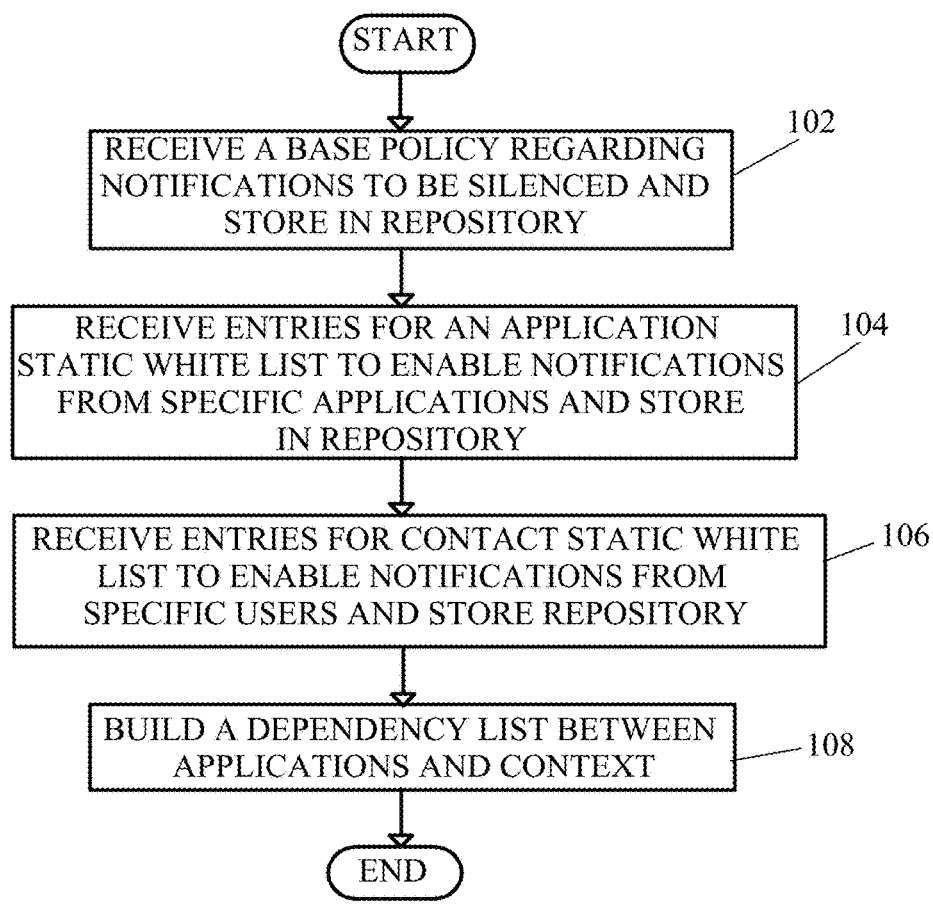
FIG. 2 shows a flow diagram of a method of establishing a static white list on a device of a user.

FIG. 2 shows a flow diagram of a method of establishing a static white list on a device of a user.

In a first step (step 102), the white list program 66 receives, from a user through the device computer 52, a base policy regarding notifications to be silenced and stores the base policy in a repository, for example repository 53. The base policy regarding notifications is the "do not disturb" policy which may be implemented by the user on the device computer 52 to silence all notifications, but the notifications allowed by the white list.

The white list program 66 then receives entries for an application static white list to enable notifications from specific applications on the device computer 52 and stores the application static white list in the repository (step 104), for example repository 53.

The white list program 66 also receives entries for a contact static white list to enable notifications from specific contacts of the user and stores the user contact static white list in the repository (step 106), for example repository 53.

Next, the white list program 66 builds a dependency list between applications and context and stores the dependency list in the repository 53 (step 108) and the method ends. It should be noted that the building of the white list in steps 102-108 is for the static white list portion of the enhanced white list. The dependency list is preferably based on context pulled from user activity.

For example, if a user were to open an e-mail relating to "sales", an entry for the taxonomy of "sales" in the dependency list is populated with active keywords from the e-mail and pre-populated applications/functions, for example a program for viewing spreadsheets. If the same user were to receive a phone call from a person identifying themselves as a sales person, who is otherwise an unknown contact, the call would generate a notification during a "do not disturb" mode of the device because of the active dependency based context.

Figure 3:
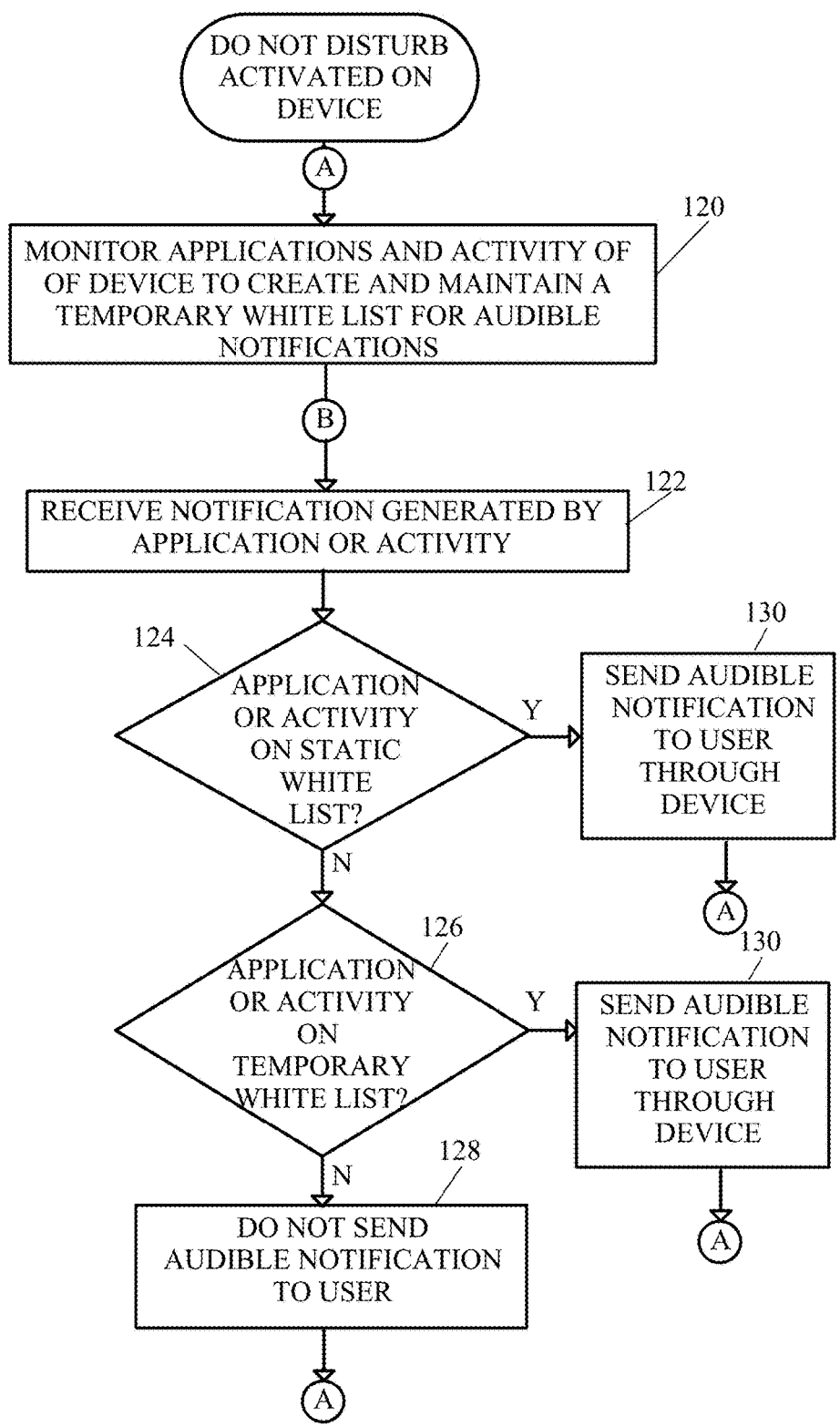
FIG. 3 shows a flow diagram of a method of filtering notifications to the user through the device based on static and temporary white lists.

FIG. 3 shows a flow diagram of a method of filtering notifications to the user through the device based on an enhanced white list comprised of a static white list and a temporary white list. It should be noted that FIG. 3 takes place after FIG. 2.

During a "do not disturb" mode or silence mode in which only notifications on white lists are allowed to be conveyed to a user of a device computer, the white list program 66 monitors applications and activities and allows only notifications to be sent to the user that were present on the white list.

It should be noted that in an alternate embodiment, the method of FIG. 3 may also take place without having the device be in a silence mode or do not disturb mode, to curb the number of notifications received by the user through the device computer.

In a first step, the white list program 66 monitors applications and activities on the device to create and maintain a temporary white list for audible notifications to the user (step 120). The sub-steps of step 120 are shown in FIG. 4.

Figure 4:
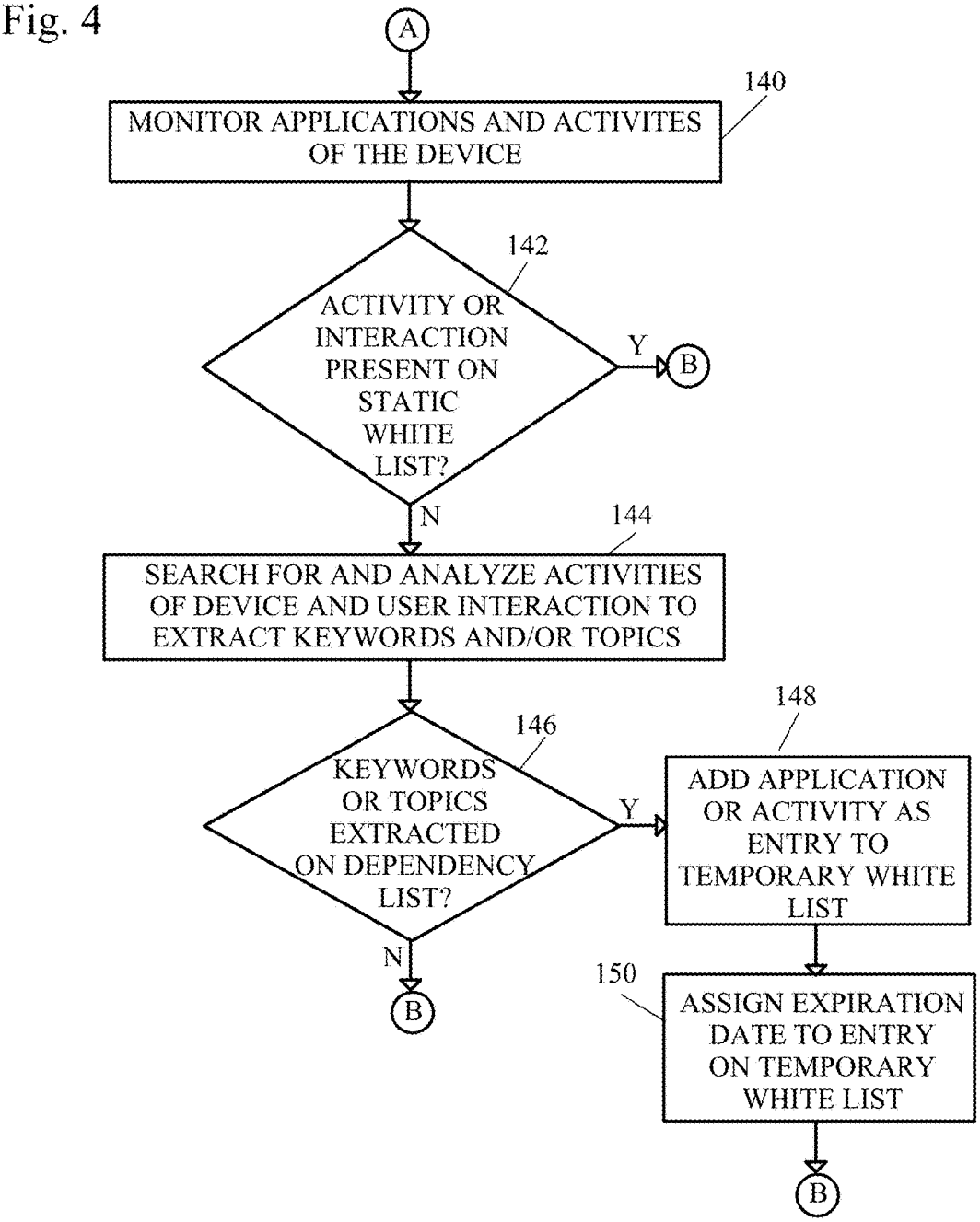
FIG. 4 shows a flow diagram of a method of monitoring activity on a device to create and maintain temporary white lists of notifications.

Referring to FIG. 4, the white list program 66 monitors applications and activities of the device (step 140). The activities may be incoming communications, such as phone calls, voice messages, text messages, emails, event reminders, task reminders, and/or interactions of a user with applications on the device which would generate a notification to the user.

If the notification regarding the activity or application is not present on the static white list (step 142), the white list program 66 searches for and analyzes activities of the device computer and user interaction with the device computer associated with the activity or application to extract keywords and/or derive a topic that that may be associated with the dependency list associated with the user (step 144). The keywords may be extracted using natural language processing, through tags, or any other context analysis.

Activities that may trigger an entry on the temporary white list may be as follows: interaction with an unknown contact via phone or short messaging service (SMS); sending a message to contacts on the static white list using an application which was not on the static white list; uploading a file through a file sharing application that provides feedback to the uploader (user); sending an invitation to a meeting with some participants on the static white list and other activities; or a message sent discussing a specific topic. Additionally, manual entry from the user may also add activities or applications to the temporary white list.

In one example, a temporary white list entry may be generated along with a specific topic. In this case, contacts that provide information regarding a specific topic will provide an audible notification to the user regardless of whether the contact was on the static white list. For example, if the user initiated with an unknown contact via SMS on a given topic (e.g. Billing), the notification will be only triggered if the unknown contact reaches back to the user based on the same topic (e.g. Billing).

In another example, if the user sent an e-mail to recipients, some of which may not be present on the static white list, the white list program may use natural language processing to determine the content and context of the email and this context to the temporary white list with the associated recipients of the e-mail. The entry in the white list for the recipients may be communication back to the user. If an incoming communication, for example a telephone call, is determined to be from a caller associated with the determined content of the e-mail and on the temporary white list, a notification noise may be generated for the user.

If the keywords which are extracted are present on the dependency list (step 146), the application or activity is added as an entry to a temporary white list (step 148). For each application or activity added to the temporary white list (step 148), an expiration date is added to each entry (step 150) and the method continues to step 122 of FIG. 3.

The expiration of the entry on the temporary white list may be based on time, a specific application based policy, completion of an event (e.g. when a call is successfully received from an unknown contact) or other information. The expiration time could be based on a specific threshold or a default time which may be set by a user.

If the keywords which are extracted are not present on the dependency list (step 144), the activity or application is not added to the temporary white list and the method returns to step 122 of FIG. 3.

If the notification regarding the activity or application is present on the static white list (step 142), the method continues to step 122 of FIG. 3.

Referring back to FIG. 3, when a notification is generated by the activity or application of the device computer (step 122), and the application is on the static white list (step 124), an audible notification is sent by the device computer to the user (step 130) and the method returns to step 120 of monitoring applications and activity of the device computer.

If the activity or application is not on the static white list (step 124), and the application or activity is on the temporary white list and has not expired (step 126), an audible notification is sent by the device computer to the user (step 130) and the method returns to step 120 of monitoring applications and activity of the device computer.

If the application is not on the static white list (step 124) and the application is not present on the temporary white list (step 126), an audible notification is not sent to the user (step 128) and the method returns to step 120 of monitoring applications and activity of the device computer.

Based on the audible notification received, the user may provide feedback as to whether the notification was appropriately received during a silent or "do not disturb" mode or received at all by the user (e.g. during a time in which silent mode was not activated).

For example, a user may dial an unknown phone number and leave a voicemail message for another user at the unknown phone number, indicating that they expect a call back. The white list program 66 may add the unknown number to the temporary notification white list, such that when receiving an incoming call from the unknown number, the user's phone generates a ring notification. It should be noted that in this same situation in the prior art, the incoming call from the unknown contact would not have generated a ring notification if the device was on silent or do not disturb mode or if the user only allows notifications for calls from contacts on the white list when the device is not in silent or do not disturb mode, since the unknown number was not one of the user's "favorite" contacts.

It will be recognized that while the examples given are for reducing audible notifications, the method may be applied to the visual notifications provided by a device computer.

FIG. 5 illustrates internal and external components of device computer 52 and server computer 54 in which illustrative embodiments may be implemented. In FIG. 5, device computer 52 and server computer 54 include respective sets of internal components 800a, 800b and external components 900a, 900b. Each of the sets of internal components 800a, 800b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and a white list program 66 are stored on one or more of the computer-readable tangible storage devices 830 for execution by one or more of the processors 820 via one or more of the RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, 800b also includes a R/W drive or interface 832 to read from and write to one or more portable computer-readable tangible storage devices 936 such as a CD-ROM, DVD, memory stick, magnetic tape, magnetic disk, optical disk or semiconductor storage device. White list program 66 can be stored on one or more of the portable computer-readable tangible storage devices 936, read via R/W drive or interface 832 and loaded into hard drive 830.

Each set of internal components 800a, 800b also includes a network adapter or interface 836 such as a TCP/IP adapter card. White list program 66 can be downloaded to the device computer 52 and server computer 54 from an external computer via a network (for example, the Internet, a local area network or other, wide area network) and network adapter or interface 836. From the network adapter or interface 836, white list program 66 is loaded into hard drive 830. The network may comprise copper wires, optical fibers, wireless transmission, routers, firewalls, switches, gateway computers and/or edge servers.

Each of the sets of external components 900a, 900b includes a computer display monitor 920, a keyboard 930, and a computer mouse 934. Each of the sets of internal components 800a, 800b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

White list program 66 can be written in various programming languages including low-level, high-level, object-oriented or non object-oriented languages. Alternatively, the functions of a white list program 66 can be implemented in whole or in part by computer circuits and other hardware (not shown).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of filtering notifications to a user from a device based on an enhanced white list comprising a static white list set by the user and a temporary white list comprising the steps of:

a processor of the device monitoring applications and activities on the device which generate notifications to the user to create and maintain a temporary white list to be used with a static white list for notifications to the user comprising the steps of the processor:

monitoring the applications and activities on the device which generate notifications and determining which of the monitored applications and activities on the device are not present on the static white list;

searching for and analyzing activities of the device and user interaction with the device to extract at least keywords and context associated with the activities and user interaction of the device;

determining whether the keywords and context extracted are associated with a dependency list between applications of the device and context; and if the keywords and context extracted are present on the dependency list, adding the application and activity on the device as an expiring entry on the temporary white list;

the processor of the device receiving a notification from an application of the device for the user; and if the application is on the enhanced white list, allowing the notification from the application to audibly sound to the user through the device.

2. The method of claim 1, wherein the static white list is formed comprising the steps of:

the processor receiving a base policy regarding notifications to be silenced from the user;

the processor receiving entries for an application static white list to enable notifications from specific applications;

the processor receiving entries for a contact static white list to enable notifications from specific contacts of the user; and the processor building a dependency list between the applications on the device and context.

3. The method of claim 1, wherein the expiration of the entries on the temporary white list is based on an event.

4. The method of claim 1, wherein the expiration of the entries on the temporary white list is based on a set time.

5. The method of claim 1, wherein a topic is derived from the extracted keywords and the expiring entry on the temporary white list is based on the topic.

6. The method of claim 1, wherein the device is in a silent mode, preventing notifications absent from the enhanced white list from sounding to the user.

7. A computer program product for filtering notifications to a user from a device based on an enhanced white list comprising a static white list set by the user and a temporary white list, the computer program product comprising a computer readable storage medium having program instructions embodied therewith, the program instructions executable by a computer comprising at least one processor, one or more memories and one or more computer readable storage media to perform a method comprising:

monitoring, by the computer, applications and activities on the device which generate notifications to the user to create and maintain a temporary white list to be used with a static white list for notifications to the user comprising the program instructions:

monitoring, by the computer, the applications and activities on the device which generate notifications and determining which of the monitored applications and activities on the device are not present on the static white list;

searching for and analyzing, by the computer, activities of the device and user interaction with the device to extract at least keywords and context associated with the activities and user interaction of the device;

determining, by the computer, whether the keywords and context extracted are associated with a dependency list between applications of the device and context; and if the keywords and context extracted are present on the dependency list, adding, by the computer, the application and activity on the device as an expiring entry on the temporary white list;

receiving, by the computer, a notification from an application of the device for the user; and if the application is on the enhanced white list, allowing the notification from the application to audibly sound to the user through the device.

8. The computer program product of claim 7, wherein the static white list is formed by the program instructions of:

receiving, by the computer, a base policy regarding notifications to be silenced from the user;

receiving, by the computer, entries for an application static white list to enable notifications from specific applications;

receiving, by the computer, entries for a contact static white list to enable notifications from specific contacts of the user; and building, by the computer, a dependency list between the applications on the device and context.

9. The computer program product of claim 7, wherein the expiration of the entries on the temporary white list is based on an event.

10. The computer program product of claim 7, wherein the expiration of the entries on the temporary white list is based on a set time.

11. The computer program product of claim 7, wherein a topic is derived from the extracted keywords and the expiring entry on the temporary white list is based on the topic.

12. The computer program product of claim 7, wherein the device is in a silent mode, preventing notifications absent from the enhanced white list from sounding to the user.

13. A computer system for filtering notifications to a user from a device based on an enhanced white list comprising a static white list set by the user and a temporary white list, the computer system comprising: at least one processor, one or more memories, and program instructions executable by the computer to perform a method comprising:

monitoring, by the computer, applications and activities on the device which generate notifications to the user to create and maintain a temporary white list to be used with a static white list for notifications to the user;

monitoring, by the computer, the applications and activities on the device which generate notifications and determining which of the monitored applications and activities on the device are not present on the static white list;

searching for and analyzing, by the computer, activities of the device and user interaction with the device to extract at least keywords and context associated with the activities and user interaction of the device;

determining, by the computer, whether the keywords and context extracted are associated with a dependency list between applications of the device and context; and if the keywords and context extracted are present on the dependency list, adding, by the computer, the application and activity on the device as an expiring entry on the temporary white list;

receiving, by the computer, a notification from an application of the device for the user; and if the application is on the enhanced white list, allowing the notification from the application to audibly sound to the user through the device.

14. The computer system of claim 13, wherein the static white list is formed by the program instructions of:

receiving, by the computer, a base policy regarding notifications to be silenced from the user;

receiving, by the computer, entries for an application static white list to enable notifications from specific applications;

receiving, by the computer, entries for a contact static white list to enable notifications from specific contacts of the user; and building, by the computer, a dependency list between the applications on the device and context.

15. The computer system of claim 13, wherein the expiration of the entries on the temporary white list is based on an event.

16. The computer system of claim 13, wherein the expiration of the entries on the temporary white list is based on a set time.

17. The computer system of claim 13, wherein a topic is derived from the extracted keywords and the expiring entry on the temporary white list is based on the topic.

18. The computer system of claim 13, wherein the device is in a silent mode, preventing notifications absent from the enhanced white list from sounding to the user.

* * * * *